(12) United States Patent
Sekiya et al.

(10) Patent No.: US 6,568,385 B2
(45) Date of Patent: May 27, 2003

(54) CUTTING MACHINE

(75) Inventors: Kazuma Sekiya, Tokyo (JP); Naoki Omiya, Tokyo (JP); Yohei Kanno, Tokyo (JP)

(73) Assignee: Disco Corporation, Tokyo (JP)

( * ) Notice: Subject to any disclaimer, the term of this patent is extended or adjusted under 35 U.S.C. 154(b) by 1 day.

(21) Appl. No.: 09/933,945

(22) Filed: Aug. 22, 2001

(65) Prior Publication Data

US 2002/0045414 A1 Apr. 18, 2002

(30) Foreign Application Priority Data

Aug. 28, 2000 (JP) ........................................ 2000-257665
Feb. 13, 2001 (JP) .......................................... 2001-35422

(51) Int. Cl.[7] ............................................... B28D 1/02
(52) U.S. Cl. ...................... 125/20; 125/13.01; 125/14; 125/15; 125/23.01
(58) Field of Search ............................... 125/13.01, 14, 125/15, 20, 23.01

(56) References Cited

U.S. PATENT DOCUMENTS

| | | | | |
|---|---|---|---|---|
| 3,739,822 A | * | 6/1973 | Loof | 142/1 |
| 4,383,909 A | * | 5/1983 | Jonsson | 204/212 |
| 4,606,150 A | * | 8/1986 | Grimm | 51/34 |
| 6,071,184 A | * | 6/2000 | Anderson, III | 451/398 |

* cited by examiner

Primary Examiner—Joseph J. Hail, III
Assistant Examiner—Shantese McDonald
(74) Attorney, Agent, or Firm—Smith, Gambrell & Russell, LLP (57) ABSTRACT

A cutting machine of a type having bellows means disposed at least on one side of a chuck table to be reciprocated. A protective sheet covering the upper surface of the bellows means is disposed. One end of the protective sheet is reciprocated in accordance with the reciprocation of the chuck table, while the other end of the protective sheet is connected to winding means. When the chuck table is moved forward or backward, the protective sheet is gradually wound up by the winding means. When the chuck table is moved backward or forward, the protective sheet is gradually wound off from the winding means.

10 Claims, 5 Drawing Sheets

CUTTING MACHINE

FIELD OF THE INVENTION

This invention relates to a cutting machine, and especially, although not limited to, a cutting machine suitable for cutting a CSP (chip size package) substrate, which has CSP formed in each of plural rectangular areas demarcated by cutting streets arranged in a lattice pattern, along the cutting streets.

DESCRIPTION OF THE PRIOR ART

CSP is practically used as a semiconductor device suitable for use in small-sized electronic equipment, such as a mobile phone and a laptop personal computer. The CSP is usually produced in the following manner: A plurality of rectangular areas are demarcated by cutting streets arranged in a lattice pattern on a suitable substrate, such as a synthetic resin substrate, and a chip such as IC or LSI is disposed in each of the rectangular areas to form CSP's. A single substrate having a plurality of CSP's formed thereon is generally called a CSP substrate. Then, the CSP substrate is cut along the cutting streets to form individual CSP's.

A cutting machine including a chuck table to be reciprocated between one end position and the other end position, and cutting means for cutting a workpiece held on the chuck table, namely, a CSP substrate, is used to cut the CSP substrate along cutting streets. The cutting means is composed of a disc-shaped rotary cutting blade containing diamond grains. The cutting means is equipped with cooling fluid jetting means for jetting a cooling fluid which may be pure water. While the chuck table is moving forward and/or backward, the rotary cutting blade is caused to act on the CSP substrate on the chuck table, performing cutting of the CSP substrate. The rotary cutting blade is rotated in a predetermined direction, for example, a direction in which the site to act on the CSP substrate moves in the forward moving direction of the chuck table. A reciprocating mechanism for reciprocating the chuck table as required includes a rotatable threaded shaft extending in a reciprocating direction, and an internal thread member screwed on the threaded shaft, with the chuck table being mounted to the internal thread member. The threaded shaft and the internal thread member are so-called precision machine elements, and adhesion of swarf and/or the cooling fluid to such elements should be avoided. Owing to the rotation of the rotary cutting blade, swarf and the cooling fluid are scattered mainly to one side as viewed in the reciprocating direction of the chuck table. For example, when the rotary cutting blade is rotated in a direction in which the site to act on the CSP substrate moves in the forward moving direction of the chuck table, swarf and the cooling fluid are scattered to the downstream side as viewed in the forward moving direction of the chuck table. Part of the cooling fluid turns into a mist, and also scatters to the upstream side as viewed in the forward moving direction of the chuck table. Thus, bellows means is disposed at least on one side, usually on both sides, as viewed in the reciprocating direction of the chuck table, to cover the precision machine elements such as threaded shaft. When the chuck table is making a forward or backward motion, the bellows means disposed downstream in the forward moving direction of the chuck table is contracted, while the bellows means disposed upstream in this direction is expanded. When the chuck table is making a backward motion, the bellows means disposed upstream in the forward moving direction of the chuck table is contracted, while the bellows means disposed downstream in this direction is expanded.

The above-described conventional cutting machine has the following problems to be solved: At the edge of a CSP substrate, there are selvedge portions where no CSP's are formed. Particularly when the CSP substrate is cut, such selvedge portions are scattered, as relatively large swarf, over the bellows means disposed on one side as viewed in the reciprocating direction of the chuck table, for example, downstream side as viewed in the forward moving direction of the chuck table when the rotary cutting blade is rotated in a direction in which the site to act on the CSP substrate moves in the forward moving direction of the chuck table. The relatively large swarf that has scattered over the bellows means tends to inhibit the smooth contraction and expansion of the bellows means. Since the bellows means needs to be smoothly contracted and expanded, it is normally formed of a cloth or a similar material. Thus, the relatively large swarf that has scattered over the bellows means has not a little chance of causing damage, such as a hole, to the bellows means.

SUMMARY OF THE INVENTION

A principal object of the present invention is to provide a novel and improved cutting machine which effectively prevents scattered swarf from inhibiting the smooth contraction and expansion of bellows means or from damaging the bellows means.

The inventors of the present invention have disposed a protective sheet for covering the upper surface of the bellows means, and have designed the protective sheet to be wound up and wound off, as desired, in accordance with the reciprocation of the chuck table, accordingly, in accordance with the contraction and expansion of the bellows means. By so doing, they have found that the above principal object can be attained.

That is, according to the present invention, there is provided as a cutting machine solving the above-mentioned principal technical problem, a cutting machine including a chuck table to be reciprocated between one end position and the other end position; bellows means disposed at least on one side of the chuck table as viewed in the reciprocating direction of the chuck table, fixed at one end to the chuck table, and fixed at the other end to a stationary member; and cutting means for cutting a workpiece held on the chuck table, and configured such that when the chuck table is moved forward and/or backward, the cutting means acts on the workpiece held on the chuck table to cut the workpiece, whereupon swarf scatters at least on the one side as viewed in the reciprocating direction of the chuck table, and when the chuck table is moved forward or backward, the bellows means is contracted, while when the chuck table is moved backward or forward, the bellows means is expanded; and wherein a protective sheet for covering the upper surface of the bellows means is disposed, one end of the protective sheet is reciprocated in accordance with the reciprocation of the chuck table, and the other end of the protective sheet is connected to winding means, so that when the chuck table is moved forward or backward, the protective sheet is gradually wound up by the winding means in accordance with the forward movement or backward movement of the chuck table, and when the chuck table is moved backward or forward, the protective sheet is gradually wound off from the winding means in accordance with the backward movement or forward movement of the chuck table.

Preferably, the winding means is composed of a shaft member mounted rotatably, and the protective sheet has a wrap tendency to be wrapped about the shaft member when no force is exerted on the protective sheet, and the protective sheet is gradually wound up by the shaft member because of the wrap tendency of the protective sheet when the chuck table is moved forward or backward. Swarf release means can be disposed for releasing swarf, which has adhered to the surface of the protective sheet, from the protective sheet wound up by the winding means. Preferably, the swarf release means is composed of a release plate disposed adjacent to the winding means, and the release plate has a tip edge contacting or approaching the surface of the protective sheet at a position immediately before the protective sheet is wound up by the winding means. In a preferred embodiment, swarf transport means is disposed downstream from the winding means as viewed in the forward moving or backward moving direction of the chuck table, and the swarf release means guides swarf, which has been released from the surface of the protective sheet, onto the swarf transport means. The swarf transport means can be composed of an endless conveyor belt mechanism. Preferably, the cutting means is equipped with cooling fluid jetting means; the endless conveyor belt mechanism includes an endless belt having many drainage holes formed therein, and drainage means disposed below the endless belt; and a cooling fluid having flowed in onto the endless belt is flowed downward into the drainage means through the drainage holes. A swarf collection vessel can be disposed, and swarf collection means for releasing swarf transported by the endless belt and guiding them into the swarf collection vessel can be disposed. The swarf collection means can be composed of brush means acting on the surface of the endless belt.

DETAILED DESCRIPTION OF THE PREFERRED EMBODIMENTS

Preferred embodiments of a cutting machine constituted in accordance with the present invention will now be described in further detail with reference to the accompanying drawings.

Figure 1:
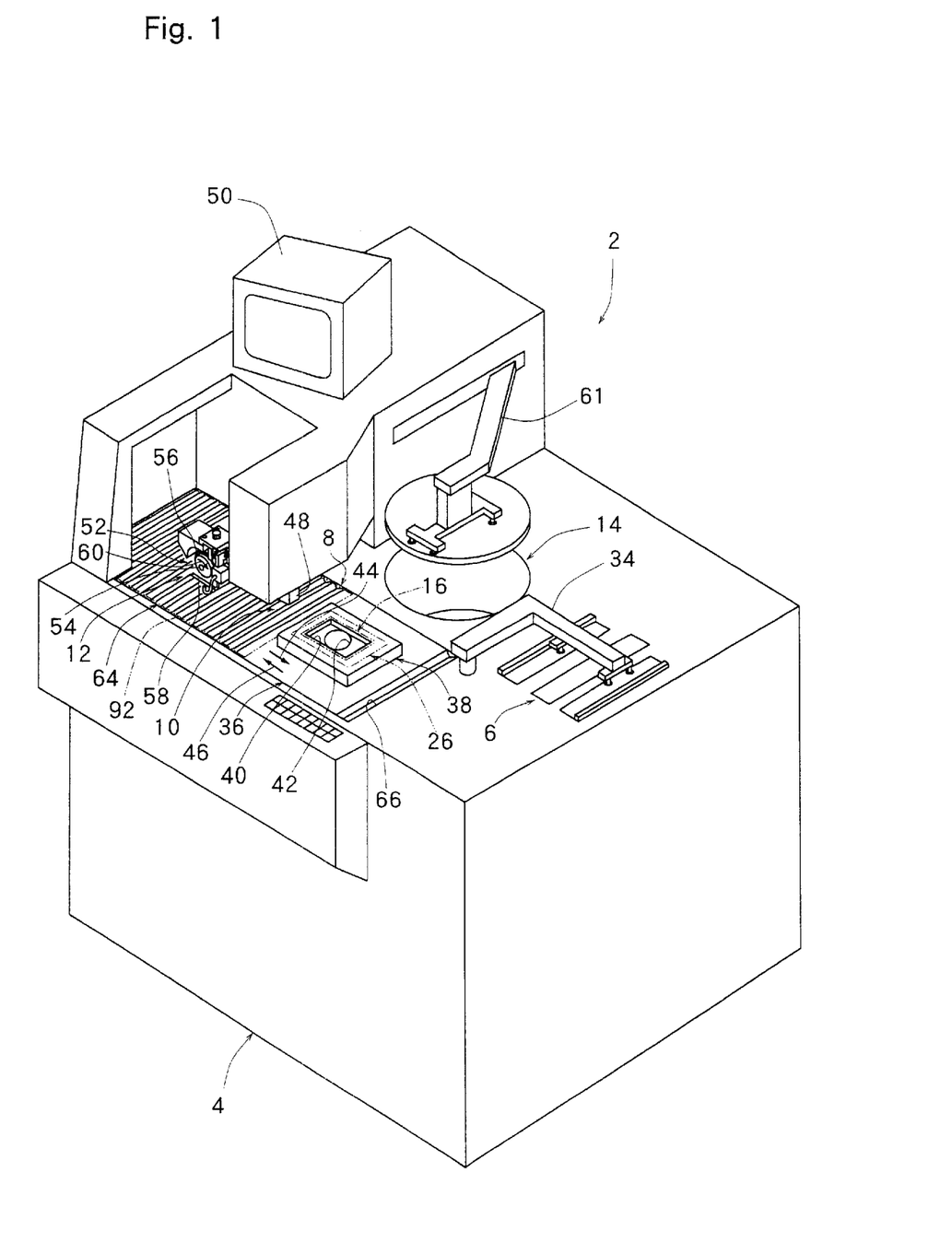
FIG. 1 is a perspective view showing the whole of a cutting machine improved in accordance with the present invention.

FIG. 1 illustrates a preferred embodiment of a cutting machine improved in accordance with the present invention. A cutting machine, indicated entirely at the numeral 2, has a housing 4, and a wait area 6, a chucking area 8, an alignment area 10, a cutting area 12, and a cleaning/drying area 14 are defined on the housing 4. A workpiece to be cut is brought in onto the wait area 6 by suitable carry-in means (not shown).

Figure 2:
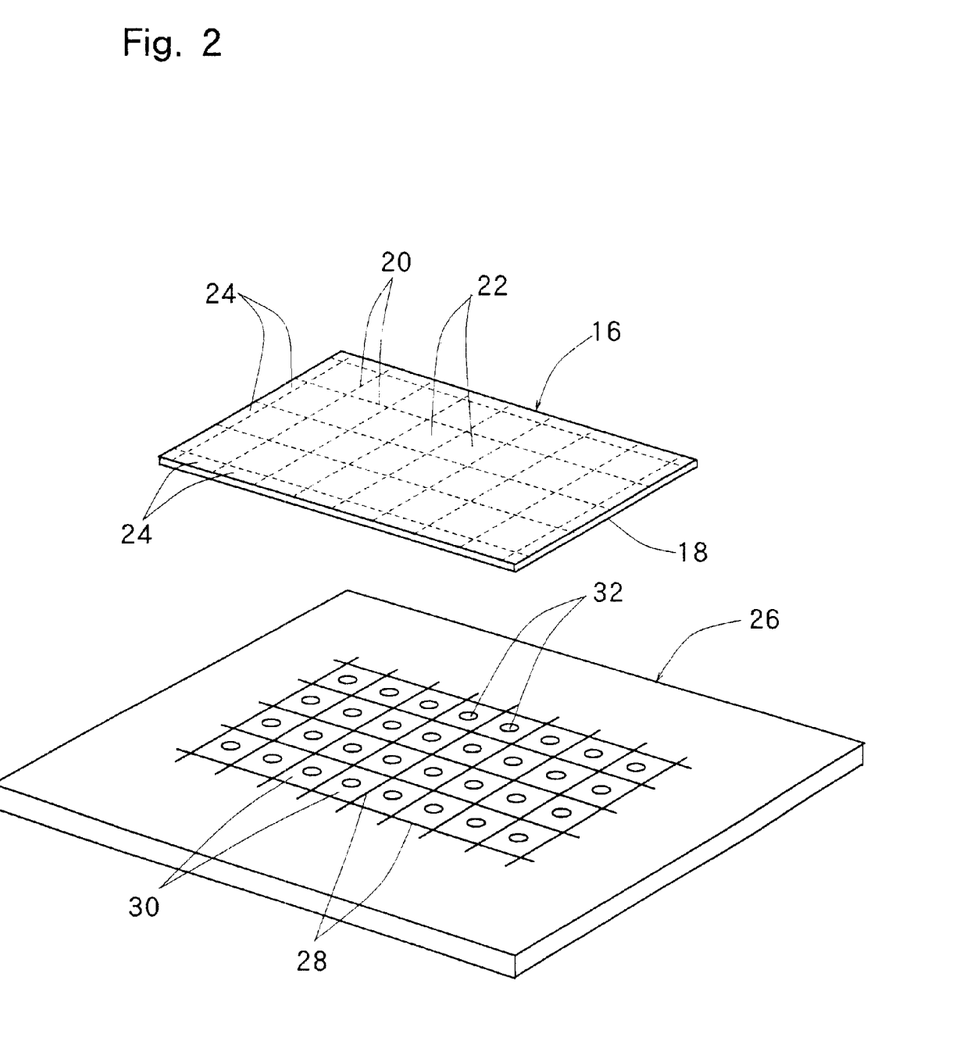
FIG. 2 is an exploded perspective view showing a CSP substrate to be cut by the cutting machine of FIG. 1, and a mounting jig used for mounting the CSP substrate on a chuck table.

FIG. 2 illustrates a typical example of the workpiece to be carried into the wait area 6. The illustrated workpiece is a CSP substrate 16, which has a synthetic resin substrate 18 of a rectangular shape. Cutting streets 20 are arranged in a lattice pattern on the synthetic resin substrate 18, and these cutting streets 20 delineate a plurality of (32 in the illustrated example) rectangular areas. In each of the rectangular areas, a CSP 22 is disposed. Selvedge portions 24 without the formation of CSP are present at the peripheral edge of the synthetic resin substrate 18. In the illustrated embodiment, the CSP substrate 16 is not singly carried into the wait area 6, but placed on a mounting jig 26 and carried into the wait area 6. The mounting jig 26, which can be formed from a suitable metal plate, is a rectangular plate somewhat larger than the CSP substrate 16. Trenches 28 are arranged in a lattice pattern at the center of the upper surface of the mounting jig 26, and these trenches 28 demarcate a plurality of (32 in the illustrated example) rectangular areas 30. Each of the rectangular areas 30 corresponds to each of the CSP's 22 in the CSP substrate 16, and the dimensions of the rectangular area 30 in the plan view are substantially the same as the dimensions of the CSP 22. In each of the rectangular areas 30 of the mounting jig 26, a suction hole 32 is formed as a through-hole in the thickness direction. On the rear surface of the mounting jig 26, a suction groove (not shown) connecting all the suction holes 32 is formed. The CSP substrate 16 is placed on the mounting jig 26, with the plurality of CSP's 22 in alignment with the corresponding rectangular areas 30 of the mounting jig 26. The mounting jig 26 having the CSP plate 16 placed on its upper surface is carried onto the wait area 6 of the cutting machine 2.

Referring again to FIG. 1, first transport means 34 is disposed in relation to the wait area 6, the chucking area 8, and the cleaning/drying area 14. The first transport means 34 sucks the mounting jig 26 carried into the wait area 6, transports the mounting jig 26 and the CSP substrate 16 placed on its upper surface to the chucking area 8, and puts them on a chuck table 36 located in the chucking area 8. The chuck table 36 in the illustrated embodiment has a rectangular suction panel 38 somewhat larger than the mounting jig 26. A rectangular suction opening 40 is formed at the center of the suction panel 38, and the front end of a suction pipe 42 is open at the suction opening 40. When the mounting jig 26 is carried onto the suction panel 38 of the chuck table 36, the suction pipe 42 is brought into communication with a vacuum source (not shown). As a result, the mounting jig 26 is vacuum attracted onto the suction panel 38, and each of the suction holes 32 formed in the mounting jig 26 is made to communicate with the vacuum source. Thus, the CSP substrate 16 (in more detail, each of the CSP's 22) is vacuum attracted to the mounting jig 26.

The chuck table 36 is mounted so as to be movable in a reciprocating manner in directions indicated by arrows 44 and 46 in FIG. 1 (the reciprocating movements of the chuck table 36 will be further described later), and is also mounted rotatably about a central axis extending substantially vertically. When the mounting jig 26 is placed on the chuck table 36, and vacuum attracted thereto, in the chucking area 8, the chuck table 36 is moved forward in the direction indicated by the arrow 44 to position the CSP substrate 16 on the mounting jig 26 in the alignment area 10. Imaging means 48 incorporating a microscope is disposed in the alignment area 10, and the imaging means 48 forms an image of the surface of the CSP substrate 16. Analysis of the formed image leads to recognition of the state of placement of the CSP substrate 16, more specifically, the positions of the cutting streets 20 on the CSP substrate 16, namely, the positions in the x-direction, corresponding to the forward and backward moving directions 44 and 46 of the chuck table 36, and the positions in the y-direction perpendicular to the x-direction. The analysis also gives recognition of the inclinations of the cutting streets 20 relative to the forward and backward moving directions 44 and 46 of the chuck table 36. The image created by the imaging means 48 is also displayed on a monitor 50 disposed on the housing 4. Then, the chuck table 36 is moved to the cutting area 12, where cutting of the CSP substrate 16 is performed. Cutting means 52 is disposed in relation to the cutting area 12. The cutting means 52 in the illustrated embodiment is composed of a rotary cutting blade 56 fixed to the tip of a rotating shaft 54 extending substantially horizontally. The rotary cutting blade 56 may be a thin-walled disc-shaped cutting blade containing diamond grains. The cutting means 52 is also equipped with cooling fluid jetting means 58 for jetting a cooling fluid such as pure water. Cutting of the CSP substrate 16 is advantageously performed in the following manner: Initially, the direction of extension of the plural cutting streets 10 extending in the x-direction in the CSP substrate 16 is set to be sufficiently accurately parallel to the forward and backward moving directions 44 and 46 of the chuck table 36, and the y-direction position of specific one of the plural cutting streets 20 is sufficiently accurately aligned with the y-direction position of the rotary cutting blade 56. For this positional alignment, use is made of the results of analysis of the image of the surface of the CSP substrate 16 imaged by the imaging means 48. Then, the rotary cutting blade 56 positioned at a predetermined height is rotated in a direction indicated by an arrow 60 (i.e., a direction in which a lower end portion of the rotary cutting blade 56 acting on the CSP substrate 16 moves in the forward moving direction 44 of the chuck table 36), and the chuck table 36 is moved forward in the direction indicated by the arrow 44. In accordance with these motions, the CSP substrate 16 is cut along a specific cutting street 20 by the action of the rotary cutting blade 56 (cutting of the CSP substrate 16 by the rotary cutting blade 56 will be further described later). A portion of the rotary cutting blade 56, which cuts the CSP substrate 16, protruding downward beyond the lower surface of the CSP substrate 16 is positioned in the trench 28 disposed in the upper surface of the mounting jig 26. When the CSP substrate 16 is cut with the rotary cutting blade 56, the cooling fluid jetting means 58 jets a cooling fluid. Upon completion of cutting along one cutting street 20, the rotating shaft 54 having the rotary cutting blade 56 fixed thereto is raised to a non-operating position, and the chuck table 36 is moved backward to a required position in the direction indicated by the arrow 46. Also, the chuck table 36 is index-moved in the y-direction, and the rotating shaft 54 having the rotary cutting blade 56 fixed thereto is lowered to a predetermined position. Then, the chuck table 36 is forwardly moved again, whereby the CSP substrate 16 is cut along a next cutting street 20. In this manner, the CSP substrate 16 is cut along the plurality of cutting streets 20 extending in the x-direction. Then, the chuck table 36 is rotated over a 90° angular range, whereupon the plurality of cutting streets 20 that have extended in the y-direction are brought into a state in which they extend in the x-direction. Then, cutting takes place for the CSP substrate 16 along each of the plural cutting streets 20 extending in the x-direction.

After the CSP substrate 16 is cut, as required, in the cutting area 12, the chuck table 36 is returned to the chucking area 8. Second transport means 61 is disposed in relation to the chucking area 8 and the cleaning/drying area 14. The second transport means 61 sucks and holds the mounting jig 26 on the chuck table 36, transports the mounting jig 26 and the CSP substrate 16, which has been placed thereon and already cut along the cutting streets 20, to the cleaning/drying area 14, and puts them on chuck means (not shown) disposed in the cleaning/drying area 14. The mounting jig 26 and the cut CSP substrate 16 present thereon are cleaned and dried by cleaning/drying means (not shown) disposed in the cleaning/drying area 14. Then, the mounting jig 26 and the cut CSP substrate 16 present thereon are transported to the wait area 6 by the first transport means 34. The mounting jig 26 and the cut CSP substrate 16 placed thereon are delivered by suitable carry-out means (not shown) to, for example, a transfer device (not shown) for transferring the individually cut CSP's 22 from above the mounting jig 26 into an accommodation case.

With reference to FIG. 1, the chuck table 36 in the illustrated embodiment is mounted so as to be movable forward and backward, in the directions indicated by the arrows 44 and 46, between the one end position indicated in FIG. 1 (the chuck table 36 is located upstream from the alignment area 10) and the other end position (the chuck table 36 is located downstream from the cutting means 52). In the chuck table 36, a reciprocating mechanism (not shown) for its forward and backward movements is disposed. The reciprocating mechanism, which may be in a well known form per se, includes a threaded shaft rotatably mounted below the chuck table 36. The threaded shaft extends in the forward and backward moving directions 44 and 46 of the chuck table 36. An internal thread member is fixed to the chuck table 36, and the internal thread member is screwed on the threaded shaft. Thus, the chuck table 36 is moved forward along the threaded shaft in the direction indicated by the arrow 44 in accordance with the normal rotation of the threaded shaft, and the chuck table 36 is moved backward along the threaded shaft in the direction indicated by the arrow 46 in accordance with the reverse rotation of the threaded shaft. The threaded shaft and the internal thread member in the reciprocating mechanism are precision machine elements, and need to be protected from swarf formed in the cutting area 12 and the cooling fluid jetted in the cutting area 12.

Figure 3:
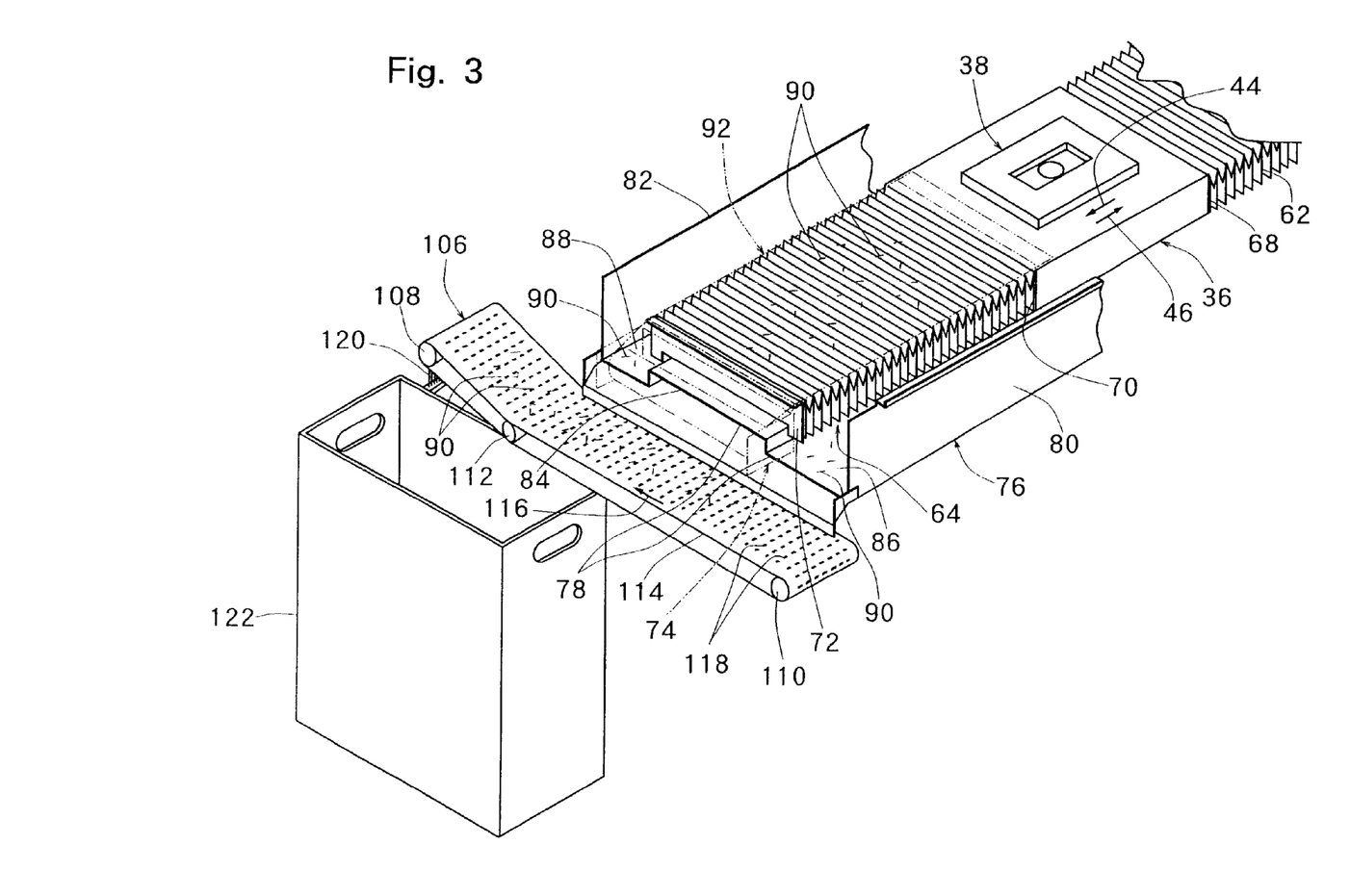
FIG. 3 is a partial perspective view showing bellows means, a protective sheet, and related means in the cutting machine of FIG. 1.

With reference to FIG. 3 along with FIG. 1, in the illustrated embodiment, bellows means 62 and 64 are disposed on both sides of the chuck table 36 as viewed in the reciprocating direction of the chuck table 36. The precision machine elements such as the threaded shaft and the internal thread member in the reciprocating mechanism are covered with the chuck table 36 itself, as well as with the bellows means 62 and 64 disposed on both sides thereof. The bellows means 62 has connecting members 66 and 68 at both ends thereof, and when the chuck table 36 is located at the aforementioned one end position, the connecting member 66 is connected to a stationary member (not shown) located upstream from the chuck table 36, while the connecting member 68 is connected to an upstream surface of the chuck table 36. The bellows means 62 may be itself formed from a suitable collapsible material such as cloth, and the connecting members 66 and 68 disposed at both ends of the bellows means 62 can be formed from a metal plate. Similarly, connecting members 70 and 72, which can be formed from a metal plate, are connected to both ends of the bellows means 64 which can be formed from a suitable collapsible material such as cloth. The connecting member 70 is connected to a downstream surface of the chuck table 36. Whereas when the chuck table 36 is located at the other end position stated earlier, the connecting member 72 is connected a stationary bracket member 74 located downstream from the chuck table 36 (the bracket member 74 will be further described later). Connection of the connecting members 66, 68, 70 and 72 to the predetermined sites can be performed by suitable connecting means such as set screws. As will be understood by reference to FIG. 3, the bellows means 62 and 64 and the connecting members 66, 68, 70 and 72 have an inverted-channel-like cross sectional shape. A partition member 76 is fixed in the housing 4. The partition member 76 has a bottom wall 78, and both side walls 80 and 82 extending upward from both side edges of the bottom wall 78. A protuberance 84 projecting upward in an inverted-channel form is formed at the center in the width direction of the bottom wall 78, and channel-shaped portions 86 and 88 are formed on both sides of the protuberance 84. As will be described later, swarf as well as the cooling fluid scatters over the channel-shaped portions 86 and 88. To flow the cooling fluid and the swarf to the downstream side as viewed in the forward moving direction of the chuck table 36, it is advantageous for the channel-shaped portions 86 and 88 to be inclined slightly downwardly toward the downstream side as viewed in the forward moving direction of the chuck table 36. In addition, it is possible to dispose liquid jetting means (not shown) which generates a flow of a liquid, optionally water, directed downstream as viewed in the forward moving direction of the chuck table 36. Bilateral downward extending legs of the bellows means 62 and 64 and connecting members 66, 68, 70 and 72 are adjacent to the protuberance 84 and located on both sides of the protuberance 84, and the main portions of the bellows means 62 and 64 and connecting members 66, 68, 70 and 72 are located above the protuberance 84. The threaded shaft in the aforementioned reciprocating mechanism extends between the main portions of the bellows means 62 and 64 and connecting members 66, 68, 70 and 72 and the protuberance 84 of the partition member 76. When the chuck table 36 is moved forward from the aforementioned one end position toward the other end position in the direction indicated by the arrow 44, the bellows means 62 is gradually expanded, and the bellows means 64 is gradually contracted, as the chuck table 36 is moved forward. On the other hand, when the chuck table 36 is moved backward from the aforementioned other end position toward the one end position, the bellows means 62 is gradually contracted, and the bellows means 64 is gradually expanded.

The above-described configurations in the illustrated cutting machine 2 do not constitute a novel feature improved in accordance with the present invention, but may be in an already known form per se. Thus, their details will be omitted herein.

With reference to FIGS. 1 and 3, in the illustrated embodiment, cutting of the CSP substrate 16 is performed by the action of the rotary cutting blade 56 rotated in the direction indicated by the arrow 60, while the chuck table 36 is being moved forward. Thus, swarf formed by cutting scatters mainly toward the downstream side of the chuck table 36 as viewed in the forward moving direction 44 of the chuck table 36. At the time of cutting, the cooling fluid is jetted by the cooling fluid jetting means 58, so that the cooling fluid also scatters. The cooling fluid scatters not only toward the downstream side of the chuck table 36, but also toward the side upstream from the chuck table 36 as a mist. However, the precision machine elements in the reciprocating mechanism of the chuck table 36, such as the threaded shaft and the internal thread member (not shown), are not damaged by the scattering swarf and cooling fluid, because they are covered with the bellows means 62 and 64. Particularly when the workpiece to be cut is the CSP substrate 16 as shown in FIG. 2, and it is cut along the cutting streets 20 arranged in a lattice pattern, selvedge portions 24 present at the peripheral edge of the CSP substrate 16 scatter, as relatively large swarf 90, particularly over the downstream side of the chuck table 36 as viewed in the forward moving direction 44 of the chuck table 36. Part of the swarf is accommodated into the channel-shaped portions 86 and 88 defined by the partition member 76, but a considerable portion of the swarf scatters over the bellows means 64. According to the inventors' experience, when relatively large swarf 90 scatters over the bellows means 64, the bellows means 64 tends to be broken during its contraction and expansion, or the smooth contraction and expansion of the bellows means 64 tends to be disturbed.

Figure 4:
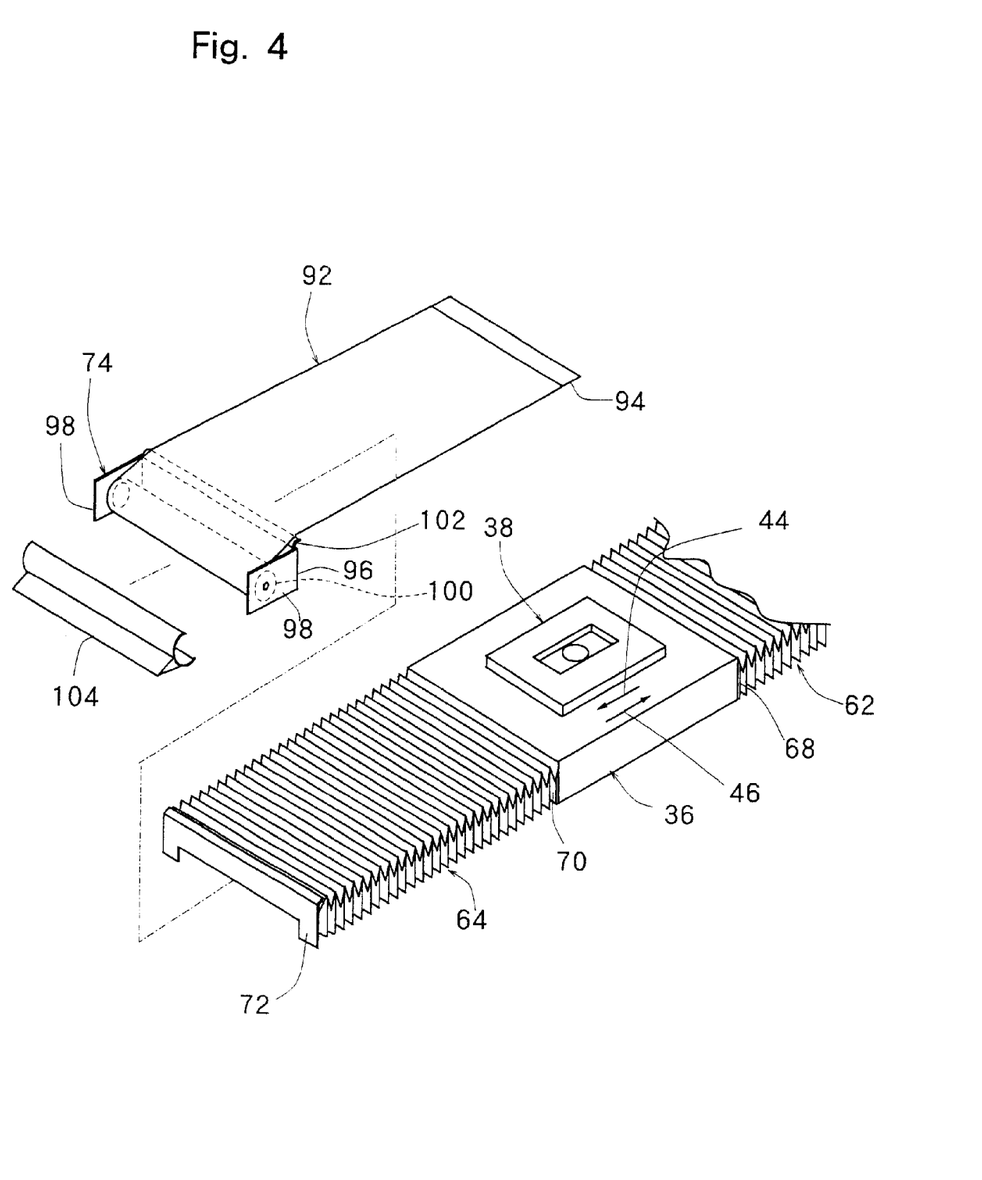
FIG. 4 is an exploded perspective view showing the bellows means, protective sheet, and related means in the cutting machine of FIG. 1.
Figure 5:
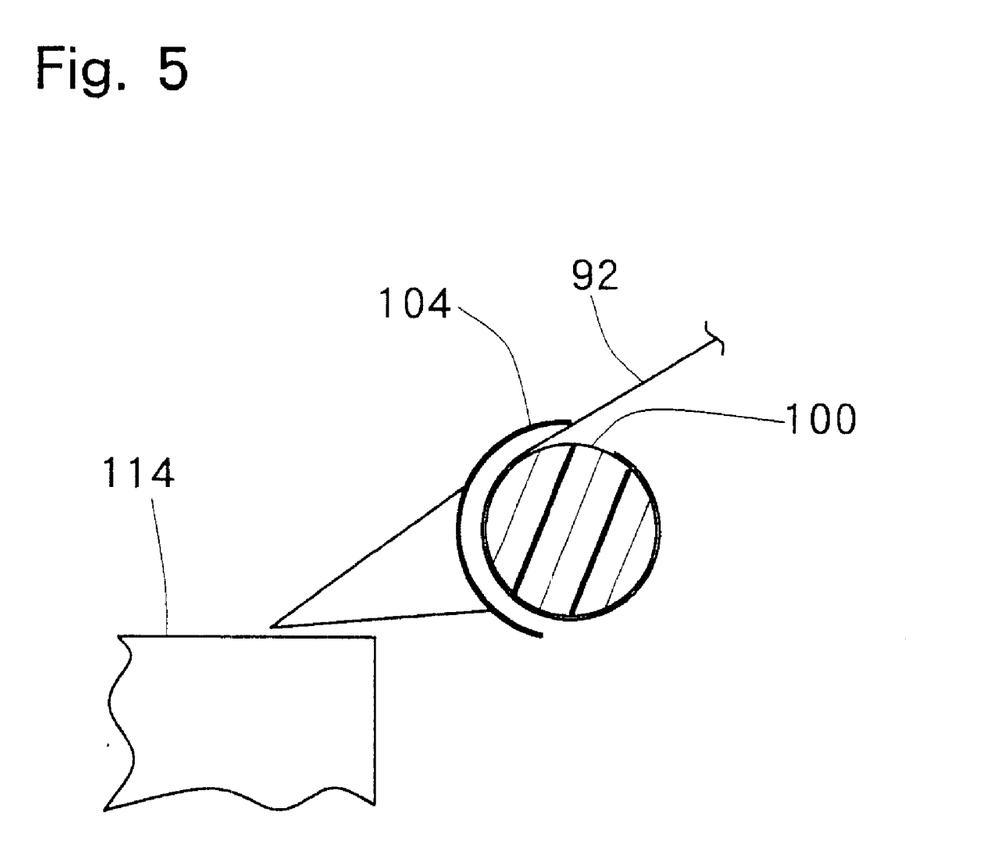
FIG. 5 is a partial sectional view showing the protective sheet, and swarf release means in the cutting machine of FIG. 1.

Referring to FIGS. 3, 4 and 5 together with FIG. 1, a protective sheet 92 for covering the bellows means 64 is disposed in the present invention in order to protect the bellows means 64 from swarf including relatively large swarf 90. A connecting member 94 is fixed to one end of the protective sheet 92, and the connecting member 94 is connected to one edge of the upper surface of the chuck table 36 by suitable connecting means such as set screws. In the illustrated embodiment, the stationary bracket member 74 has a main wall portion 96, to which the connecting member 72 of the bellows means 64 is connected, and also has opposite side wall portions 98 projecting to the downstream side from both sides of the main wall portion 96. A shaft member 100 constituting winding means is rotatably mounted between the opposite side wall portions 98. The other end portion of the protective sheet 92 extending over the bellows means 64 is fixed to the shaft member 100. The protective sheet 92 may be formed from a suitable plastic sheet such as a polyester sheet or a polyethylene terephthalate sheet, and has a tendency to be wrapped round the shaft member 100, a so-called wrap tendency. To impart this wrap tendency to the protective sheet 92, it is recommendable, for example, to heat the protective sheet 92 at a suitable temperature while wrapping the protective sheet 92 about the shaft member 100. When the chuck table 36 is moved forward in the direction indicated by the arrow 44, one end of the protective sheet 92 is moved in the direction of the arrow 44 in accordance with the forward movement of the chuck table 36. According to such a movement, the protective sheet 92 is gradually wound up by the shaft member 100. When the chuck table 36 is moved backward in the direction indicated by the arrow 46, one end of the protective sheet 92 is moved in the direction of the arrow 46 in accordance with the backward movement of the chuck table 36. According to such a movement, the protective sheet 92 is gradually wound off from the shaft member 100. A guide piece 102 extending and curved upwardly and toward the upstream side is formed integrally with the main wall portion 96 of the stationary bracket member 74. The guide piece 102 guides the protective sheet 92 when the protective sheet 92 is taken up by the shaft member 100 and paid out from the shaft member 100. Instead of using the protective sheet 92 having the wrap tendency, it is possible, if desired, to wind up and wind off the protective sheet by driving the shaft member 100 in normal rotation and reverse rotation.

With reference to FIGS. 3 to 5, swarf release means 104 is mounted between the opposite side wall portions 98 of the stationary bracket member 74. The swarf release means 104 has a release plate having a tip edge which is made to contact or approach the surface of the protective sheet 92 at a position immediately before the protective sheet 92 is wound up by the shaft member 100. Swarf transport means 106 is disposed downstream from the swarf release means 104 and below the swarf release means 104. The swarf transport means 106 in the illustrated embodiment is composed of an endless conveyor belt mechanism extending in the axial direction of the shaft member 100, and includes a driven roller 108, follower rollers 110 and 112, and an endless belt 114 looped over these rollers 108, 110 and 112. The driven roller 108 is connected to a rotational drive source which may be an electric motor, and is rotationally driven in a direction indicated by an arrow 116, whereby the endless belt 114 is driven in the direction indicated by the arrow 116. Preferably, many drainage holes 118 are formed in the endless belt 114 which can be formed from a suitable material such as synthetic rubber. The swarf transport means 106 is equipped with swarf collection means 120 and a swarf collection vessel 122. The swarf collection means 120 in the illustrated embodiment is composed of brush means in contact with or in proximity to the surface of the endless belt 114 at one end of a lower travel portion of the endless belt 114. The swarf collection vessel 122 is disposed below the swarf collection means 120, and its upper surface is open.

With reference to FIGS. 3 to 5 along with FIG. 1, swarf and cooling fluid, which have scattered over the channel-shaped portions 86 and 88 defined by the partition member 76 owing to the cutting of the CSP substrate 16 in the cutting area 12, flow down the channel-shaped portions 86 and 88 in the forward moving direction 44 of the chuck table 36, and they are dropped from the downstream end of the channel-shaped portions 86 and 88 onto the endless belt 114 of the swarf transport means 106. The swarf and cooling fluid, which have scattered on the downstream side of the chuck table 36 as viewed in the forward moving direction 44 of the chuck table 36, fall on the protective sheet 92 covering the bellows means 64. Swarf, especially relatively large swarf 90, is not directly dropped onto the bellows means 64. When the chuck table 36 is moved forward in the forward moving direction 44, and accordingly, one end of the protective sheet 92 is moved in the forward moving direction 44, the swarf and cooling fluid that have scattered over the protective sheet 92 are moved in the forward moving direction 44 together with the protective sheet 92. When they are moved close to the shaft member 100, the swarf is released from the protective sheet 92 by the action of the swarf release means 104, guided by the surface of the release plate constituting the swarf release means 104, and led onto the endless belt 114 of the swarf transport means 106. The cooling fluid on the protective sheet 92 is also led onto the endless belt 114 together with the swarf. The swarf dropped onto the endless belt 114 is transported in the direction indicated by the arrow 116 in accordance with the movement of the endless belt 114, and dropped into the swarf collection vessel 122 at the site of directional change of the endless belt 114. Alternatively, the swarf is released from the endless belt 114 by the action of the swarf collection means 120, and led into the swarf collection vessel 122. On the other hand, the cooling fluid dropped on the endless belt 114 is flowed downward through the drainage holes 118 formed in the endless belt 114, and is collected into drainage means (not shown) disposed below the swarf transport means 106. The drainage means can be composed of a drainage duct or a drainage hose.

Preferred embodiments of the cutting machine improved in accordance with the present invention have been described in detail. However, there is no need to dwell on the facts that the present invention is not restricted to these embodiments, but various changes and modifications may be made without departing from the spirit and scope of the invention. In the illustrated embodiment, for example, the protective sheet and related means are disposed in relation to one of the bellows means disposed on both sides of the chuck table. If swarf is likely to scatter on both bellows means, for example, the protective sheet and related means can be disposed in relation to both bellows means. In the illustrated embodiment, moreover, the bellows means are disposed on both sides of the chuck table. However, when swarf and cooling fluid scatter on only one side of the chuck table, the bellows means on the other side of the chuck table can be omitted.

What we claim is:

1. A cutting machine including:
   a chuck table to be reciprocated between one end position and another end position;
   bellows means disposed at least on one side of said chuck table as viewed in a reciprocating direction of said chuck table, fixed at one end to said chuck table, and fixed at another end to a stationary member; and
   cutting means for cutting a workpiece held on said chuck table, and configured such that
   when said chuck table is moved forward and/or backward, said cutting means acts on the workpiece held on said chuck table to cut the workpiece, whereupon swarf scatters at least on the one side as viewed in the reciprocating direction of said chuck table, and
   when said chuck table is moved forward or backward, said bellows means is expanded or contracted; and wherein
   a protective sheet for covering an upper surface of said bellows means is disposed,
   one end of said protective sheet is reciprocated in accordance with reciprocation of said chuck table, and another end of said protective sheet is connected to winding means, so that when said chuck table is moved forward or backward, said protective sheet is gradually wound off or wound up by said winding means in accordance with forward movement or backward movement of said chuck table.

2. A cutting machine as claimed in claim 1, wherein said winding means is composed of a shaft member mounted rotatably, and said protective sheet has a wrap tendency to be wrapped about said shaft member when no force is exerted on said protective sheet, and said protective sheet is gradually wound up by said shaft member because of the wrap tendency of said protective sheet when said chuck table is moved backwaed.

3. A cutting machine as claimed in claim 1, wherein swarf release means is disposed for releasing swarf which has adhered to a surface of said protective sheet, from said protective sheet wound up by said winding means.

4. A cutting machine as claimed in claim 3, wherein said swarf release means is composed of a release plate disposed adjacent to said winding means, and said release plate has a tip edge contacting or approaching the surface of said protective sheet at a position immediately before said protective sheet is wound up by said winding means.

5. A cutting machine as claimed in claim 3, wherein swarf transport means is disposed downstream from said winding means as viewed in a forward moving or backward moving direction of said chuck table, and said swarf release means guides swarf, which has been released from the surface of said protective sheet, onto said swarf transport means.

6. A cutting machine as claimed in claim 5, wherein said swarf transport means is composed of an endless conveyor belt mechanism.

7. A cutting machine as claimed in claim 6, wherein said cutting means is equipped with cooling fluid jetting means; said endless conveyor belt mechanism includes an endless belt having many drainage holes formed therein, and drainage means disposed below said endless belt; and a cooling fluid having flowed in onto said endless belt is flowed downward into said drainage means through said drainage holes.

8. A cutting machine as claimed in claim 6, wherein a swarf collection vessel is disposed, and swarf collection means for releasing swarf transported by said endless belt from said endless belt, and guiding the swarf into said swarf collection vessel is disposed.

9. A cutting machine as claimed in claim 8, wherein said swarf collection means is composed of brush means acting on a surface of said endless belt.

10. A cutting machine comprising:

- a chuck table to be reciprocated between one end position and other end position;
- a first bellows means disposed at a side of said chuck table as viewed in a reciprocating direction of said chuck table, fixed at one end to said side of said chuck table, and fixed at other end to a first stationary member;
- a second bellows means disposed at an opposite side of said chuck table as viewed in a reciprocating direction of said chuck table, fixed at one end to said opposite side of said chuck table, and fixed at other end to a second stationary member; and cutting means for cutting a workpiece held on said chuck table, and configured such that when said chuck table is moved forward and/or backward, said cutting means acts on the workpiece held on said chuck table to cut the workpiece, whereupon swarf scatters at least on the one side as viewed in the reciprocating direction of said chuck table, and when said chuck table is moved forward, said first bellows means is contracted, and said second bellows means is expanded, and when said chuck table is moved backward, said first bellows means is expanded, and said second bellows means is contracted; and wherein a first protective sheet for covering an upper surface of said first bellows means is disposed, one end of said first protective sheet is reciprocated in accordance with reciprocation of said chuck table, and other end of said first protective sheet is connected to a first winding means, and a second protective sheet for covering an upper surface of said second bellows means is disposed, one end of said second protective sheet is reciprocated in accordance with reciprocation of said chuck table, and other end of said second protective sheet is connected to a second winding means, so that when said chuck table is moved forward or backward, said first and second protective sheets are gradually wound up or wound off by said winding means in accordance with forward movement or backward movement of said chuck table.

* * * * *